Oct. 24, 1944.   E. S. COOK   2,361,087
VARIABLE LOAD BRAKE
Filed Oct. 29, 1942
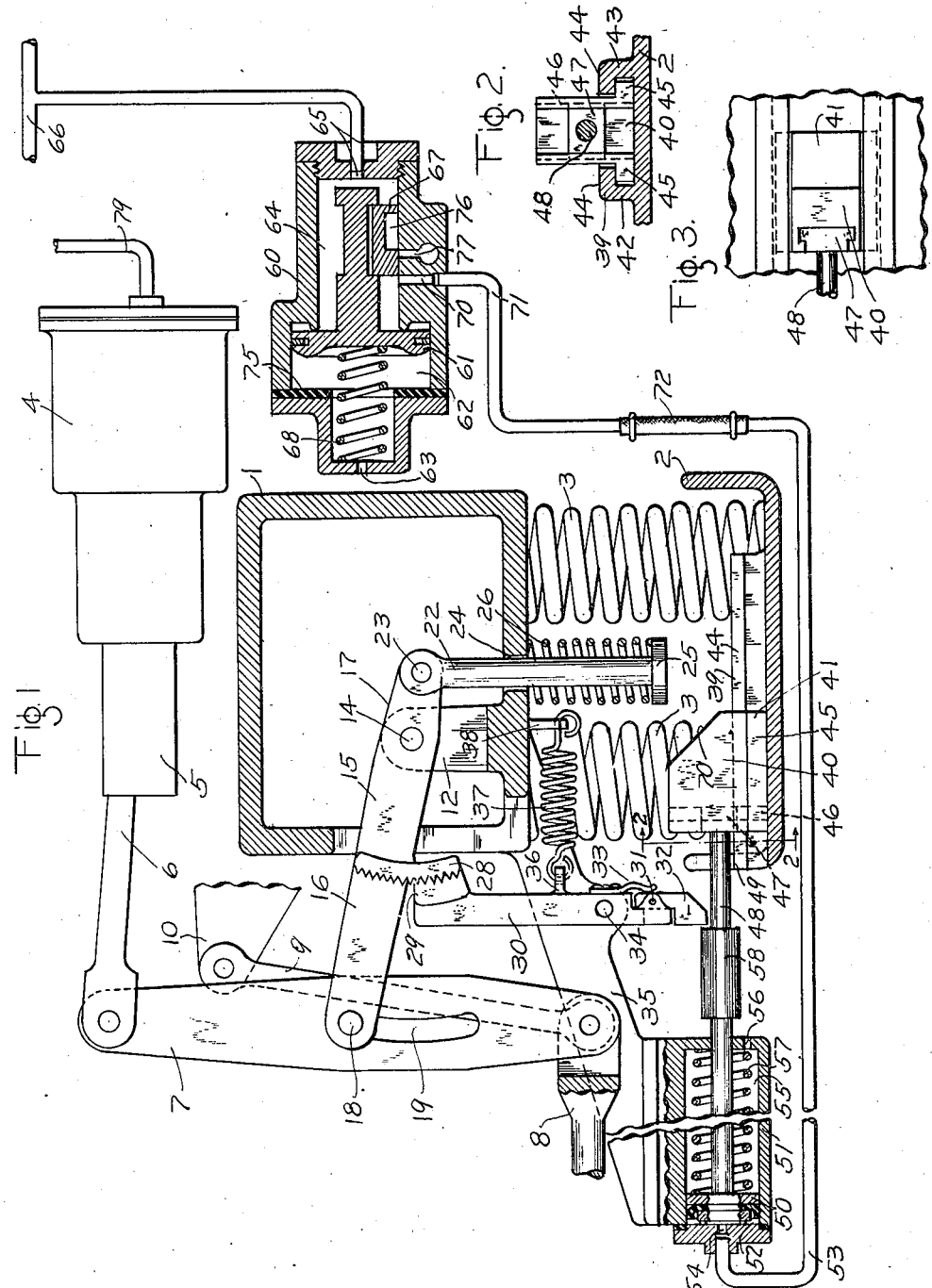
INVENTOR
EARLE S. COOK
BY
A. M. Higgins
ATTORNEY Patented Oct. 24, 1944

2,361,087

UNITED STATES PATENT OFFICE 2,361,087

VARIABLE LOAD BRAKE

Earle S. Cook, Wilkinsburg, Pa., assignor to The Westinghouse Air Brake Company, Wilmerding, Pa., a corporation of Pennsylvania Application October 29, 1942, Serial No. 463,731

14 Claims. (Cl. 188—195)

This invention relates to railway vehicle brake apparatus and more particularly to variable load brake apparatus of the type comprising a brake rigging in which the leverage thereof may be automatically varied in accordance with variations in the weight of the load on the vehicle so as to correspondingly vary the force with which the brake is applied.

An object of the invention is to provide a novel variable load brake apparatus of the above mentioned type.

Another object of the invention is to provide a variable load brake apparatus of the above mentioned type with means whereby the leverage of the brake rigging is varied, only when the pressure of fluid in the brake system is being increased in charging, according to the degree of relative movement between a sprung and unsprung part of the vehicle, and whereby at all other times the means is unaffected by relative movement between said parts.

Other objects and advantages will appear in the following detailed description of the invention.

In the accompanying drawing

Fig. 1 is a diagrammatic view partly in section, of a railway truck embodying the invention, parts of the truck and of the brake rigging being omitted to more clearly illustrate certain details of the invention.

Fig. 2 is a fragmentary sectional view taken on the line 2—2 of Fig. 1 to illustrate one of the brake rigging adjusting elements and a part of the truck with which it is associated.

Fig. 3 is a plan view of the adjusting element and associated truck part illustrated in Fig. 2.

As shown in Fig. 1 of the drawing, the variable load brake apparatus is applied to a railway vehicle truck which may be of the usual well known construction having a truck bolster 1, laterally spaced side frames (not shown) which are rigidly carried in the usual manner by the wheel and axle assemblies (not shown), and also having a spring plank 2 which is fixed to the truck frames and upon which the usual truck bolster supporting springs 3 seat.

The variable load brake apparatus comprises the usual brake cylinder device having a cylinder 4 which may be rigidly secured in any suitable manner to a fixed part of the vehicle truck, such for instance as the truck frame, or if desired may be secured to the truck bolster. The brake cylinder contains the usual piston having a hollow push rod 5 which projects beyond the end of the cylinder and in which is rockably mounted the usual push rod 6. The outer end of the push rod is operatively connected to the upper end of a vertically disposed brake cylinder lever 7, the lower end of the lever being operatively connected to one end of a longitudinally extending pull rod 8 leading to the other brake rigging elements (not shown), which actuate the usual friction braking elements into and out of braking engagement with the wheel and axle assemblies of the vehicle truck. The lower end of the brake cylinder lever 7 is also connected to the lower end of a brake hanger 9, which hanger, at its upper end is connected to a bracket 10 carried by the truck bolster 1.

Rigidly attached to the bolster 1 and extending upwardly from the lower side thereof is a pair of upwardly extending laterally spaced lugs 12, only one of which is shown, which carry a pin 14 upon which is rockably mounted a lever 15 which extends in a direction transversely of the bolster. At one side of the pin 14 the lever comprises an arm 16 which projects beyond one side of the truck bolster and at the other side the lever comprises an arm 17, the arm 16 being of greater length than the arm 17 and terminating in the vicinity of the longitudinal center line of the bolster.

The end of the arm 16 carries a pin 18 which passes through a slotted opening 19 formed in the brake cylinder lever 7 intermediate its ends. This pin serves as a fulcrum for the lever.

The end of the arm 17 is connected to the upper end of a vertically extending rod 22 by means of a pin 23, which rod extends through a suitable opening 24 provided in the bolster 1 and is provided at its lower end with a spring seat in the form of a collar 25.

Interposed between the collar 25 and the lower side of the bolster 1 is a spring 26 which acts, at all times, to bias the rod 22 and thereby the arm 17 of the lever 15 downwardly.

The arm 16 of the lever 15 is provided, at a point intermediate the pins 14 and 18, with a serrated or toothed locking portion or segment 28 which is adapted to be engaged by a correspondingly shaped toothed locking portion 29 which is carried at the upper end of a member 30, which member, as shown in the drawing, may be in the form of a vertically disposed lever.

The lower end of the member 30 carries a pin 31 on which there is pivotally mounted an element in the form of a latch 32 which is normally maintained in the position shown in Fig. 1 of the drawing by means of a leaf spring 33 which is carried by the member above the latch and preferably adjacent thereto the member is pivotally mounted on a pin 34 carried by a bracket 35 which is rigidly attached to the bolster 1 and projects downwardly and outwardly from the lower side thereof.

The member 30 is provided with a projection 36 to which one end of a coil spring 37 is attached, the opposite end of the spring being attached to a bracket 38 carried by and extending downwardly from the lower side of the bolster 1. This spring tends, at all times, to maintain the member 30 in the position in which it is shown and as a consequence acts to yieldably maintain the locking portion 29 in engagement with the locking segment 28.

The upper side of the spring plank 2 is provided with a guide member 39 which extends transversely of the spring plank. Slidably mounted in this guide member is a member 40, having at one end a wedged shaped portion 41, the upper surface of the member being sloped upwardly and outwardly in the direction of the left hand and away from the longitudinal center line of the spring plank and the lower surface being parallel with the bottom wall of the guide member 39. The guide member 39, as best shown in Fig. 2 of the drawing, may be made integral with the spring plank 2 and may comprise a pair of spaced upwardly extending elements 42 and 43. Each of the elements 42 and 43 are provided with a short inwardly extending flange 44 adapted to engage a shoulder 45, provided on bottom of the member 40, to prevent upward movement of the member relative to the spring plank.

The member 40, at its left hand end, is provided with a vertically extending slot or recess 46 in which there is slidably mounted a collar 47. This collar is attached to one end of an actuating rod 48 which extends through a suitable open ended slot 49 provided in a flange extending upwardly from one side of the spring plank 2 and at its opposite end is connected in any suitable manner to a piston 50. The piston 50 is contained in a cylinder 51 which is rigidly attached to the bracket 35 carried by the truck bolster.

At one side of the piston 50 there is a chamber 52 which is connected to a pipe 53 by way of a passage 54. At the opposite side of the piston 50 there is a chamber 55 which is in constant open communication with the atmosphere by way of a passage 56. Contained in chamber 55 and interposed between and operatively engaging the piston and the inner end wall of the chamber is a spring 57 which tends, at all times, to urge the piston 50, actuating rod 48 and member 40 to the position in which they are shown in the drawing.

The actuating rod 48 is provided with a collar or enlarged portion 58 which is adapted to be moved into and out of engagement with the latch 32 for a purpose hereinafter described.

The apparatus further comprises a changeover control valve device 60 which may be attached in any suitable manner to the vehicle body or any other desired sprung part of the vehicle and may comprise a casing in which there is mounted a piston 61. At one side of the piston 61 there is a chamber 62 which is constantly connected through a passage 63 with the atmosphere. At the opposite side of the piston there is a valve chamber 64 which is constantly connected through a passage and pipe 65 with the usual brake pipe 66.

Contained in valve chamber 64 is a slide valve 67 which is adapted to be operated by a piston stem carried by the piston 61. Contained in chamber 62 is a spring 68 which, at all times, acts on the piston and tends to urge the piston, piston stem and slide valve toward the position in which they are shown in Fig. 1 of the drawing.

The seat for the slide valve 67 is provided with a passage 70 which is in constant open communication with a pipe 71. The pipe 71 is connected to the pipe 53 by means of a flexible hose 72, which hose accommodates lateral movement between the sprung and unsprung parts of the vehicle truck.

It is obvious that any variation in the position of the fulcrum pin 18 with relation to the brake cylinder lever 7 within the slotted opening 19 will result in a variation in the leverage ratio of the brake rigging and thereby a variation in the braking power of the rigging.

If the fulcrum pin 18 is moved longitudinally in a direction away from the brake cylinder the arm of the brake lever 7 to which the push rod is connected, will be correspondingly lengthened, so that when the brake cylinder is operated, the power transmitted by the opposite end of the lever to the pull rod 8 will be correspondingly increased. If the pin is moved from the lower end of the slotted opening in a direction toward the push rod 6 the power transmitted to the pull rod will be decreased.

Operation

Assuming the vehicle, embodying the invention, to be empty and separated from a train, the brakes on the vehicle released and the brake pipe of the vehicle deplete of fluid under pressure. Under these conditions the several parts of the equipment will be in the position illustrated in the drawing.

Now when the empty vehicle is placed in a train, the brake pipe 66 will of course be supplied with fluid under pressure, the brake pipe throughout the train being fully charged to the normal pressure carried before the train is put in motion.

Fluid under pressure supplied to the brake pipe flows therefrom through pipe and passage 65 to the valve chamber 64 of the changeover control valve device 60. With the changeover control valve slide valve 67 in its innermost position, as shown in the drawing, fluid under pressure flows from the valve chamber 64 through passage 70, pipe 71, flexible hose 72 and pipe 53 to chamber 52 in the cylinder 51. The changeover control valve piston and slide valve remain in this position until the pressure of fluid in valve chamber 64 has been increased sufficiently, for instance to approximately thirty-five pounds, to cause the piston and slide valve to move outwardly against the opposing pressure of the spring 68 to a position in which the slide valve 67 cuts off communication between valve chamber 64 and passage 70 and opens a communication between passage 70 and the atmosphere.

As the pressure of fluid supplied to chamber 52 in the cylinder increases, the piston 50 and attached actuating rod 48 are caused to move longitudinally in a direction toward the right, as viewed in the drawing, against the opposing pressure of spring 57.

Movement of the rod 48 in this direction causes the collar or enlarged portion 58 carried thereby and the attached member 40 to move in the same direction. As the rod continues to move in a direction toward the right-hand the collar 58 engages the latch 32. Since the latch is so constructed and arranged that it cannot rock about the pin 31 in a counter-clockwise direction relative to the member 30 the member 30 is now caused to rock in a counter-clockwise direction about the pivot pin 34, against the opposing action of spring 37. The member 30 as it is thus rocked moves the locking portion 29 out of locking engagement with the teeth of the segment 28 carried by the lever 15, thereby unlocking the lever 15. At the same time, the continued movement of the rod 48 causes the wedge shaped end 41 of the member 40 to pass under the collar 25 of the rod 22. Continued movement of the rod causes the upper or highest surface of the member 40, to pass under the lower side of the collar 25 carried by the lower end of the rod 22, and also causes the collar 58 carried by the rod to pass under the latch 32.

Since the vehicle is empty the truck bolster 1 will be in its normal position and as a consequence the lever 15 and rod 22 will be in their normal position, in which position they are shown in Fig. 1 of the drawing. With the rod 22 thus positioned, the clearance between the lower side of the collar 25 at the end thereof and the upper side of the spring plank 2 is sufficient to permit movement of the member 40 between the two without causing any upward movement of rod 22 in opposition to the spring 26, so that the fulcrum pin 18 carried at the outer end of arm 16 of the lever 15, will remain positioned in the upper end of the slotted opening 19 in the brake cylinder lever 7.

At the time that the highest portion of the member 40 is moved into the vertical plane of the collar 25 or shortly thereafter the collar 58 moves from under the latch 32 thus freeing the latch and member 30. The spring 37 now acts to effect clockwise rotation of the member 30 about the pivot pin 34. The member 30 as it is thus rocked causes the toothed locking portion 29 to move into locking engagement with the toothed portion 28 of the lever 15, thereby locking the lever 15.

Since as above mentioned there is no change in the position of the rod 22 or the lever 15 at this time the fulcrum pin 18 will remain positioned in the upper end of the slotted opening 19 in the brake cylinder lever 7 as shown.

When the pressure of fluid in chamber 64 of the changeover control valve device 60 has been increased to about 35 pounds, the piston 61 will be caused to move outwardly against the opposing pressure of the spring 68 until brought to a stop by its engagement with a gasket 75 which is rigidly secured to the casing.

With the changeover control valve piston 61 in this position the slide valve 67 will have been moved into a position in which a cavity 76 contained therein connects the passage 70 to an atmospheric passage 77. With this communication established, fluid under pressure in chamber 52 of the cylinder 51 is quickly vented to the atmosphere, by way of passage 54, pipe 53, flexible hose 72, pipe 71, passage 70, cavity 76 in the slide valve 67 and atmospheric passage 77. Upon a reduction of pressure in chamber 52 due to this venting, the spring 57 causes the piston 50, member 40 and actuating rod 48 to move in a direction toward the left-hand into the position in which they are shown in Fig. 1 of the drawing.

As the rod 48 is thus moved, the collar 58 carried thereby engages and rocks the latch 32 in a clockwise direction about pivot pin 31 against the opposing force of the leaf spring 33 thus permitting the collar 58 to pass under the member 30. When the collar has been moved in this direction into the position in which it is out of engagement with the latch, the leaf spring 33 will cause the latch to rock in a counter-clockwise direction about the pivot pin 31 into the position in which it is shown in the drawing. At the time the collar 58 clears the latch the member 40 will have been moved into the position in which it is shown in the drawing.

With the fulcrum pin 18 locked in position and with the member 40 moved to the position in which it is shown, the brake rigging is still in condition for operation to provide the proper braking for the empty vehicle.

It should here be mentioned that when the vehicle is in transit and the fulcrum pin 18 is locked in any position within the slotted opening 19 by interengagement of the teeth on the locking portion 29 of the member 30 and the toothed portion 28 of the lever 15, the member 40 will be out of the path of vertical travel of the rod 22 and collar 25, so that relative movement between bolster 1 and spring plank 2 cannot cause shocks or heavy forces to be transmitted to the adjusting and locking members thus effectively guarding these members against damage.

When it is desired to effect an application of the brakes fluid under pressure may be supplied to a pipe 79 in the usual manner by a brake controlling valve device which may be of the "AB" or any other desired type. Fluid under pressure supplied to pipe 79 flows to the brake cylinder 4 causing the brake cylinder piston, hollow piston rod 5 and push rod 6 to move in a direction toward the left-hand. As the push rod 6 moves in a direction toward the left-hand it actuates the brake cylinder lever 7 to move the pull rod 8 to cause the brake shoes (not shown) to frictionally engage the tread of the truck wheels.

Assuming now that, while the vehicle is separated from a train and the brake pipe is deplete of fluid under pressure, lading is placed on the body of the vehicle. Under the influence of the additional weight which the lading imposes on the truck bolster 1, the bolster springs 3 will yield and permit the bolster 1 to move downwardly relative to the spring plank 2. As the bolster 1 thus moves, the lever 15, rod 22 and bracket 35 carrying the member 30 and the cylinder 51 move with it, thus reducing the clearance distance between the under side of collar 25 and the upper surface of the spring plank 2.

It will be understood that the piston 50 and attached actuating rod 48 move downwardly with the cylinder 51 and that the member 40 carried by the spring plank 2 remains stationary, such relative movement between the rod 48 and the member 40 being permitted by the sliding connection between collar 47 at the outer end of the rod and the member 40.

Now when the loading of the vehicle is completed and the vehicle is placed in a train and the brake pipe is charged with fluid under pressure, locking portion 29, carried by the member 30, is caused to be moved out of locking engagement with the toothed portion 28 of the lever 15, and the member 40 is caused to be moved into the vertical plane of the collar 25 at the lower end of the rod 22 in the same manner as before described in connection with the adjustment of the brake rigging for empty braking.

After the teeth of the locking portion 29 of the member 30 have been moved out of locking engagement with the toothed portion 28 of the lever 15, the sloping surface 70 of the member 40 will, due to the reduced clearance between the collar 25 and the spring plank, engage the under side of the collar 25. Now as the member 40 continues to move in the direction toward the right-hand the member 40 causes the rod 22 to move upwardly against the opposing pressure of spring 26. This movement continues until the highest surface of the member 40 is brought into engagement with the under side of the collar 25. The rod 22 as it is thus moved, acts, through the medium of pin 23, to rock the lever 15 in a counter-clockwise direction about the pin 14 thus causing the arm 17 of the lever 15, to move upwardly. This rocking movement of the lever 15 causes the arm 16 and thereby the fulcrum pin 18 at the other side of the pin 14 to move downwardly, the pin 18 moving in the slotted opening 19 in the brake cylinder lever 7. From this it will be understood that the fulcrum pin 18 will be automatically positioned relative to the brake cylinder lever 7 to provide for the degree of braking called for by the weight of the lading carried on the vehicle.

With the full adjustment of the brake rigging accomplished the spring 37 acts in the manner hereinbefore described in connection with adjustment of the brake rigging for an empty vehicle to automatically lock the rigging in its load adjusted position. Now when the pressure in the brake pipe has been increased to about 35 pounds the member 40 will be moved out of engagement with the collar 25 at the lower end of rod 22 in identically the same manner as hereinbefore described in connection with the adjustment of the brake rigging for an empty vehicle. The fulcrum pin 18 will be maintained in its adjusted position by the locked lever 15 until the brake pipe 66 is again depleted of fluid under pressure.

It will be understood from the foregoing description that when the system is charged with fluid under pressure to approximately 35 pounds the brake rigging will be conditioned in accordance with the load carried by the vehicle and will be locked in this condition until such time as the pressure of fluid in the brake pipe of the fluid pressure brake system is reduced to below the setting of the changeover valve device 60.

Having now described my invention, what I claim as new and desire to secure by Letters Patent, is:

1. In a vehicle variable load brake equipment of the type having a brake lever and means for actuating said lever, in combination, a fulcrum for said brake lever movable relative to the lever in accordance with variation in the weight of the load carried by the vehicle, a control lever carried by a sprung part of the vehicle operative to position said fulcrum, locking means for locking said control lever and thereby said fulcrum in any selected position, and a combined lock controlling and fulcrum positioning mechanism movable by fluid under pressure to first unlock said fulcrum and to then position the fulcrum with relation to the lever.

2. In a vehicle variable load brake equipment of the type having a brake lever and means for actuating said lever, in combination, a fulcrum for said brake lever movable relative to the lever in accordance with variation in the weight of the load carried by the vehicle, a control lever carried by a sprung part of the vehicle operative to position said fulcrum, locking means for locking said control lever and thereby said fulcrum in any selected position, means operative to actuate said control lever, locking means for locking said control lever and thereby said fulcrum in any selected position and movable to an unlocking position, and a combined lock controlling and fulcrum positioning mechanism movable by fluid under pressure to first effect operation of said locking means to said unlocking position and to then effect operation of said means to actuate said control lever.

3. In a vehicle variable load brake equipment of the type having a brake lever and means for actuating said lever, in combination, a fulcrum for said brake lever movable relative to the lever in accordance with variation in the weight of the load carried by the vehicle, a control lever pivotally carried by said sprung part of the vehicle operatively connected at one end to said fulcrum and operative to position said fulcrum, a vertically disposed member operatively connected to the opposite end of said control lever and operative to actuate said control lever, locking means carried by the sprung part of the vehicle for locking said control lever and thereby said fulcrum in any selected position, means slidably mounted on an unsprung part of the vehicle for actuating said member, and means carried by the sprung part of the vehicle and operative by an increase in fluid under pressure to first effect operation of said locking means to unlock said control lever and thereby said fulcrum and to them effect operation of said first mentioned means.

4. In a vehicle variable load brake equipment of the type having a brake lever and means for actuating said lever, in combination, a fulcrum for said brake lever movable relative to the lever in accordance with variation in the weight of the load carried by the vehicle, a control lever pivotally carried by said sprung part of the vehicle operatively connected at one end to said fulcrum and operative to position said fulcrum, a vertically disposed member operatively connected to the opposite end of said control lever and operative to actuate said control lever, locking means carried by the sprung part of the vehicle for locking said control lever and thereby said fulcrum in any selected position, an element slidably mounted on an unsprung part of the vehicle for actuating said member, and means carried by said sprung part of the vehicle and operative by an increase in fluid pressure to first effect operation of said locking means to unlock said control lever and thereby said fulcrum and to then effect operation of said element, said means comprising a movable abutment having an actuating rod operatively connected to said element and an enlarged portion for effecting operation of said locking means.

5. In a vehicle variable load brake equipment of the type having a brake lever and means for actuating said lever, in combination, a fulcrum for said lever movable relative to the lever in accordance with variations in the weight of the load carried by the vehicle, locking means for locking said fulcrum in any selected position, and an element movable by fluid under pressure for first unlocking said fulcrum and for then positioning the fulcrum with relation to the lever, said element comprising a movable abutment, an actuating rod carried by said abutment, a member for effecting movement of said fulcrum operatively connected to said rod and means carried by the rod for effecting operation of said locking means.

6. In a vehicle variable load brake equipment of the type having a brake lever and means for actuating said lever, in combination, a fulcrum for said lever movable relative to the lever in accordance with variations in the weight of the load carried by the vehicle, locking means for locking said fulcrum in any selected position, means movable by fluid under pressure for first unlocking said fulcrum and for then positioning the fulcrum with relation to the lever, said means comprising a member carried by a sprung portion of the vehicle and another member carried by an unsprung portion of the vehicle, and means operatively connecting said member and other member.

7. In a vehicle variable load brake equipment of the type having a brake lever and means for actuating said lever, in combination, a fulcrum for said lever movable relative to the lever in accordance with variations in the weight of the load carried by the vehicle, locking means for locking said fulcrum in any selected position, and means operative to first unlock said fulcrum and to then position said fulcrum, said means comprising a member carried by an unsprung part of the vehicle operative to effect the positioning of said fulcrum and also comprising fluid pressure responsive means carried by a sprung part of the vehicle operative to actuate said member.

8. In a vehicle variable load brake equipment of the type having a brake lever and means for actuating said lever, in combination, a fulcrum for said lever movable relative to the lever in accordance with variations in the weight of the load carried by the vehicle, locking means for locking said fulcrum in any selected position, a first member carried by a sprung part of the vehicle operative to unlock said fulcrum, a second member carried by an unsprung part of the vehicle operative to position said fulcrum, and means responsive to an increase in fluid under pressure to first effect operation of said first member and to then effect operation of said second member.

9. In a vehicle variable load brake equipment of the type having a brake lever and means for actuating said lever, in combination, a fulcrum for said lever movable relative to the lever in accordance with variations in the weight of the load carried by the vehicle, locking means for locking said fulcrum in any selected position, means operative to first unlock said fulcrum and to then position said fulcrum, said means comprising a member carried by an unsprung part of the vehicle and fluid pressure responsive means carried by a sprung part of the vehicle for actuating said means, and a lost motion connection between said member and said fluid pressure responsive means to permit relative vertical movement between the said means and fluid pressure responsive means occasioned by relative movement between said sprung and the unsprung parts of the vehicle.

10. In a vehicle variable load brake equipment of the type having a brake lever and a brake cylinder for actuating said lever, in combination, a fulcrum for said lever movable relative to the lever in accordance with variations in the weight of the load carried by the vehicle, a control lever for shifting said fulcrum, a toothed segment carried by said control lever, a lock member adapted to engage said toothed segment for locking said control lever and thereby said fulcrum in any selected position, means for effecting movement of said lock member into and out of engagement with said toothed segment, said means comprising a spring for effecting movement of said lock member into engagement with said toothed segment and a movable abutment responsive to an increase in fluid under pressure for effecting movement of said lock member out of engagement with said toothed segment, means operative to position said control lever and thereby said fulcrum, and fluid pressure responsive means operative to control the operation of the first and second mentioned means.

11. In a variable load brake apparatus for a vehicle truck of the type having a fixed part and a movable part, which movable part is constructed and arranged for vertical movement relative to the fixed part in response to variations in the weight imposed thereon, in combination, a brake lever operatively connected at one end to a brake member to be operated, a brake cylinder carried by said fixed part and operatively connected to the other end of said brake lever and operative to actuate the brake lever and thereby said member, a slotted opening in said brake lever extending longitudinally of the lever intermediate its ends, a fulcrum for said lever disposed in said slotted opening, a control lever carried by said movable part operative to shift said fulcrum along the brake lever, and means comprising a member carried by said fixed part independently of said control lever and operative to actuate the control lever.

12. In a variable load brake apparatus for a vehicle truck of the type having a fixed part and a movable part, which movable part is constructed and arranged for vertical movement relative to the fixed part in response to variations in the weight imposed thereon, in combination, a brake lever operatively connected at one end to a brake member to be operated, a brake cylinder carried by said fixed part and operatively connected to the other end of said brake lever and operative to actuate the brake lever and thereby said member, a slotted opening in said brake lever extending longitudinally of the lever intermediate its ends, a fulcrum for said lever disposed in said slotted opening, a control lever carried by said movable part operative to shift said fulcrum along the brake lever, means comprising a member carried by said fixed part independently of said control lever and operative to actuate said control lever, and fluid pressure responsive means for controlling the operation of said means.

13. In a variable load brake apparatus for a vehicle truck of the type having a fixed part and a movable part, which movable part is constructed and arranged for vertical movement relative to the fixed part in response to variations in the weight imposed thereon, in combination, a brake lever operatively connected at one end to a brake member to be operated, a brake cylinder carried by said fixed part and operatively connected to the other end of said brake lever and operative to actuate the brake lever and thereby said member, a slotted opening in said brake lever extending longitudinally of the lever intermediate its ends, a fulcrum for said lever disposed in said slotted opening, a control lever carried by said movable part operative to shift said fulcrum along the brake lever, means comprising a member carried by said fixed part independently of said control lever and operative to actute said control lever, and means carried by said movable part operative to lock said control lever and thereby said fulcrum in any selected position.

14. In a variable load brake apparatus for a vehicle truck of the type having a fixed part and a movable part, which movable part is constructed and arranged for vertical movement relative to the fixed part in response to variations in the weight, imposed thereon, in combination, a brake lever operatively connected at one end to a brake member to be operated, a brake cylinder carried by said fixed part and operatively connected to the other end of said brake lever and operative to actuate the brake lever and thereby said member, a slotted opening in said brake lever extending longitudinally of the lever intermediate its ends, a fulcrum for said lever disposed in said slotted opening, a control lever carried by said movable part operative to shift said fulcrum along the brake lever, locking means carried by said movable part and operative to lock said control lever and thereby said fulcrum in any selected position, and a combined lock controlling and fulcrum positioning mechanism movable by fluid under pressure to first unlock said fulcrum and to then effect movement of said control lever to position said fulcrum, said mechanism comprising a fluid pressure responsive abutment carried by said movable part, a member slidably mounted on said fixed part and means operatively connecting said movable abutment to said member.

EARLE S. COOK.